US005731567A

United States Patent [19]
Kato et al.

[11] Patent Number: 5,731,567
[45] Date of Patent: Mar. 24, 1998

[54] THERMAL WORKING METHOD OF METAL MATERIAL CONTAINING HELIUM AND THERMAL WORKING APPARATUS THEREFOR

[75] Inventors: Takahiko Kato; Hideyo Kodama; Toshimi Matsumoto, all of Hitachinaka; Yasuhisa Aono; Tetsuya Nagata, both of Hitachi; Shigeo Hattori, Ibaraki-ken; Junya Kaneda; Shigeki Ono, both of Hitachi, all of Japan

[73] Assignee: Hitachi, Ltd., Tokyo, Japan

[21] Appl. No.: 551,801

[22] Filed: Nov. 7, 1995

[30] Foreign Application Priority Data

Nov. 8, 1994 [JP] Japan .................... 6-273316

[51] Int. Cl.⁶ .................................. B23K 9/00
[52] U.S. Cl. ................ 219/137 R; 219/136; 228/232
[58] Field of Search ................... 219/137 WM, 219/137 R, 136; 148/566, 520; 228/232

[56] References Cited

U.S. PATENT DOCUMENTS 4,229,235  10/1980  Matsuda et al. ................ 148/520
5,106,010  4/1992  Stueber et al. ................. 228/232

FOREIGN PATENT DOCUMENTS 62-23928   1/1987   Japan .

OTHER PUBLICATIONS

Wang et al., "Technique to Eliminate Helium Induced Weld Cracking in Stainless Steels", ASTM STP1175, no date.
Kanne, Jr., "Remote Reactor Repair: GTA Weld Cracking Caused by Entrapped Helium", Aug. 1988, Welding Journal, pp. 33–39.

*Primary Examiner*—Clifford C. Shaw
*Attorney, Agent, or Firm*—Antonelli, Terry, Stout, & Kraus, LLP

[57] ABSTRACT

A method of performing thermal working to metal material containing helium, which comprises the steps of previously feeding current through a thermally working portion of the metal material containing helium to thereby reduce a helium content in the portion without melting the portion and then heating and melting the portion to improve the defects of the metal structure of the metal material containing helium. As a result, the improvement and removal of defects of the metal structure can be achieved by reducing a helium content in the thermally working portion of the metal material.

11 Claims, 15 Drawing Sheets

FIG. 8
| | BEAD-ON |
|---|---|
| SHAPE OF TEST PIECE | 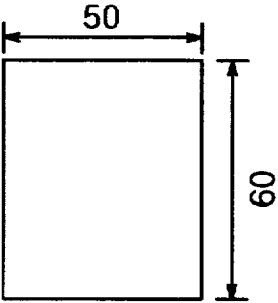 |
| WEDING | METHOD | TIG |
| | FILLER | |
| | GROOVE | |
| | BEAD CROSS SECTIONAL SHAPE | 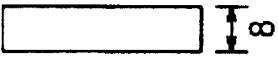 |
| | BEAD WIDTH | 2.5mm |

FIG. 9

| SAMPLE No. | TREATMENT BEFORE WELDING (CORRESPONDING TO TABLE 2) | CROSS SECTION AFTER WELDING | |
|---|---|---|---|
| 8 | NO TREATMENT | 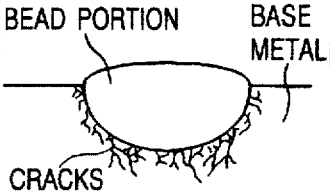 BEAD PORTION / BASE METAL / CRACKS | REFERENCE MATERIAL |
| 9 | LOW TEMPERATURE HEAT TREATMENT UNDER VACUUM 350°C×172hr  2×10⁻⁵torr | 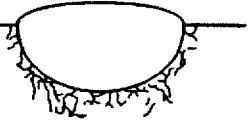 | CONVENTIONAL TREATMENT |
| 10 | LOW TEMPERATURE HEAT TREATMENT UNDER VACUUM 500°C×172hr  2×10⁻⁵torr | 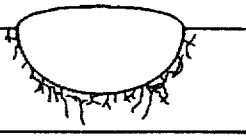 | CONVENTIONAL TREATMENT |
| 11 | LOW TEMPERATURE HEAT TREATMENT UNDER SURROUNDING ATMOSPHERE 350°C×172hr | 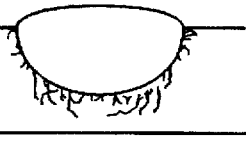 | CONVENTIONAL TREATMENT |
| 12 | LOW TEMPERATURE HEAT TREATMENT UNDER SURROUNDING ATMOSPHERE 500°C×172hr |  | CONVENTIONAL TREATMENT |
| 13 | CURRENT-FEEDING UNDER HIGH TEMPERATURE CURRENT DENSITY 500A/cm², 200hr, 5×10⁻⁹ torr ; MAX. TEMPERATURE 900°C |  | TREATMENT OF THE INVENTION |
| 14 | CURRENT-FEEDING UNDER LOW TEMPERATURE ; CURRENT DENSITY 500A/cm² , 500hr, Ar GAS BLOWING ; MAX. TEMPERATURE 500°C |  | TREATMENT OF THE INVENTION |

THERMAL WORKING METHOD OF METAL MATERIAL CONTAINING HELIUM AND THERMAL WORKING APPARATUS THEREFOR

BACKGROUND OF THE INVENTION

1. Field of the Invention

The present invention relates to a thermal working method of preventing cracks from occurring in the worked portion of metal material containing helium when the material is thermally worked and to an apparatus applied to the method.

In particular, the present invention relates to a thermal working method for the repair or improvement in material of the structures and equipments which are made of metal material and which constitute a nuclear power generation plant (fast breeder, advanced thermal reactor, boiling water reactor, pressurized water reactor and etc.) or a nuclear fusion apparatus (nuclear fusion reactor) during a service period of time or prolonged service period of time, and more specifically, to a method and apparatus suitable for the thermal working of metal material containing helium mainly occurring by nuclear transformation during the above periods of time.

2. Description of the Related Art

It is predicted that the mechanical property and corrosion resistance of structures of equipments composed of metal material and installed in a nuclear fusion apparatus (nuclear fusion reactor) and a nuclear reactor such as a fast breeder, advanced thermal reactor, boiling water reactor, pressurized water reactor and etc. are lowered due to the deterioration in material over a period of time. Further, although the presence of crack-like defects due to deterioration over a period of time is not admitted at present, it is preferable to establish a defect repairing method for the sake of such a accident as crack-like defects occurs due to certain reason.

In view of this respect, technologies for repairing deteriorated portions in the material and further technologies for repairing portions where the above crack-like defects are caused have been widely searched.

There is a thermal working method making use of arc or laser heat sources as one of the above technologies. There is known a processing for surface-solutioning, surface-melting or surface-alloying a deteriorated portion in the material caused in the structures and equipments as a thermal working method of carrying out improvement in material of the deteriorated portion of the structures and equipments.

Further, as a method of repairing a portion where crack-like defects are caused, there are known a thermal working method of mechanically removing a cracked portion and then filling the removed portion by built-up welding and a thermal working method of reinforcing a cracked portion by covering a region including the cracked portion with a sheet member and then joining the peripheral portion of the sheet member to the structures and equipments by fillet welding.

However, the above-mention methods have not recognize such a problem as, when the above thermal working is carried out to the structures and equipments composed of metal material constituting a nuclear power generation plant and nuclear fusion apparatus during a service period of time or prolonged service period of time, a crack is caused due to the existence of helium in a worked portion.

In the nuclear power generation plant, nuclear fusion apparatus (nuclear fusion reactor) and etc., helium occurs in the material of the structures and equipments by the nuclear transformation reaction (n, $\alpha$) of elements constituting the material of the structures and equipments used under the environment of irradiation of a high energy corpuscular beam, in particular, a neutron beam.

That is, when a thermal neutron is irradiated, helium occurs from boron (B) and nitrogen (N) by a direct (n, $\alpha$) reaction and from nickel (N) by a two stage reaction of $^{58}$Ni (n, $\gamma$)$^{59}$Ni→$^{59}$Ni (n, $\alpha$)$^{56}$Ni, and when a fast neutron is irradiated, helium occurs from Ni, iron (Fe) and chromium Cr by the direct (n, $\alpha$) reaction in addition to B and N.

Further, when a high energy neutron greater than 4–6 MeV is irradiated, helium occurs from all the elements by the direct (n, $\alpha$) reaction.

It is known that when the above repair or improvement in material is carried out to the structures and equipments, the above helium causes a fine crack in a heat-affected zone (HAZ) due to the thermal working (including welding).

This matter is disclosed in a scientific literature "Welding Journal", 1988, pp 33 –39.

According to an example disclosed therein, it is deemed that when thermal working accompanied by melting is carried out to metal material containing helium, a crack is induced to a HAZ portion by the formation of bubbles of helium to the grain boundaries of the HAZ portion due to the two factors multiplexed to each other in that helium in the metal material is diffused to the grain boundaries of the HAZ portion by heat input in the thermal working and that tensile stress is caused in the HAZ portion by the solidification shrinkage of a welded portion.

On the other hand, it is disclosed in a scientific literature "Technique to eliminate helium induced weld cracking in stainless steel", ASTM STP 1175 that intercrystalline cracking can be restrained by performing welding while applying compression stress to a test piece of a laboratory level from a direction perpendicular to a welding line, as a method of reducing a crack caused when metal material containing helium is thermally worked.

However, there has not been known any practically effective method of thermal working (welding) to be carried out under practically effective compression stress load while assuming such a case as the structures and equipments constituting a nuclear power generation plant and nuclear fusion apparatus are thermally worked.

Japanese Patent Unexamined Publication No. 62-23928 discloses a method of reducing stress corrosion cracking, which is caused by the irradiation of radioactive rays, of a material (austenitic stainless steel) subjected to the irradiation of a neutron by the heat treatment of the material at a low temperature of about 350°–500° C.

However, this method does not disclose any respect regarding whether or not helium created in the material by the irradiation of radioactive rays can be effectively reduced or removed.

Consequently, there has been a problem that it cannot be confirmed whether a crack occurring in a worked portion by thermal working carried out thereto can be more substantially prevented or not by the heat treatment at a low temperature of about 350°–500° C. in the publication when there is assumed the repair or improvement in material of the structures and equipments of a nuclear power generation plant and nuclear fusion apparatus subjected to the irradiation of radioactive rays during a service period of time or prolonged service period of time.

Consequently, it is desired to provide a thermal working method and a thermal working apparatus capable of preventing a crack from occurring at a worked portion and actually permitting practical working to be carried out when the repair and improvement in material of the structures and equipments constituting a nuclear power generation plant and nuclear fusion apparatus are performed during a service period of time or prolonged service period of time.

SUMMARY OF THE INVENTION

An object of the present invention is to practically make it possible to perform thermal working for the repair and improvement in material of metal material containing helium while preventing a crack from occurring in a worked portion by the thermal working.

A first means for achieving the above object is a thermal working method of metal material containing helium, comprising the steps of previously feeding current through a thermal working portion of the metal material while preventing this portion from melting, to thereby reduce a helium content in the portion and then heating and melting the portion. A second means is a thermal working method of metal material containing helium, wherein in the method of the first means the previous current feed through the thermal working portion of the metal material containing helium is performed while heating the metal material. According to a third means, there is provided a still another thermal working method of metal material containing helium, wherein in the method of the first means the previous current feed through the thermal working portion of the metal material containing helium is performed in vacuum or inert gas. A fourth means is a thermal working method of metal material containing helium, wherein in the method of the second means the previous current feed through or/and heating to the thermal working portion of the metal material containing helium are performed in vacuum or in inert gas. A fifth means is a thermal working method of metal material containing helium, wherein in the method of the first or second means the metal material is metal material constituting a nuclear power generation plant or a nuclear fusion apparatus in a service period of time or a prolonged service period of time. A sixth means is a thermal working method of metal material containing helium, wherein in the method of the fifth means the metal material is metal material containing helium created by nuclear transformation due to the irradiation of neutron. A seventh means is a thermal working apparatus for metal material containing helium, which apparatus comprises a current-feeding means for feeding current through the metal material containing helium and melting means for melting the metal material. An eighth means is a thermal working apparatus for metal material containing helium, which apparatus comprises an inspection means for detecting defects of the metal material containing helium, a current-feeding means for feeding current through the metal material and a melting means for melting the metal material. A ninth means is a thermal working apparatus for metal material containing helium, which apparatus comprises a current-feeding means for feeding current through the metal material containing helium, a melting means for melting the metal material, a location adjustment driving means for freely movably supporting the current-feeding means or the melting means with respect to the surface of the metal material, a chamber incorporating the location adjustment driving means and having an open portion confronting the surface, a replacement device having a gas blowing port connected to the chamber which device replaces the interior atmosphere of the chamber by a gas phase, a moving device for moving the chamber in a horizontal direction while supporting the chamber, a rotating device for vertically rotatably supporting the moving device, a forward or back driving device for supporting the rotating device so that the rotating device is freely driven forward or back with respect to the surface, a support pillar for supporting the forward or back driving device, and a crane for three-dimensionally movably supporting the support pillar. A tenth means is a thermal working apparatus for metal material containing helium, wherein in the apparatus of the nineth means the support pillar has such an outer shape as the support pillar can be put into and taken out from the upper grid plate and lower grid plate in a nuclear reactor.

According to the first means, current is fed through the thermally working portion of the metal material containing helium to thereby previously reduce a helium content in the above portion. Thereafter, the portion is melted by heating so that the improvement and removal of defects of a metal structure may be performed.

According to the second means, since current can be fed through the metal material in such a state as the metal material is heated with the temperature thereof being raised, a function for further reducing the helium content can be obtained, in addition to the function of the method of the first means.

According to the third means, there can be obtained a function for reducing the deterioration of the surface of the current-feeded portion (which deterioration is caused by the rise of temperature during the current feed) by changing an atmosphere, in which the current is fed through the metal material, into vacuum or inert gas, in addition to the function of the method of the first means.

According to the fourth means, there can be obtained a function for reducing the surface deterioration of a current-feeded portion by performing the current feed through or/and heating to the metal material in an atmosphere of vacuum or inert gas, in addition to the function of the method of the second means.

According to the fifth means, in the metal material constituting the nuclear power generation plant or the nuclear fusion apparatus in the service period of time or the prolonged service period of time there can be brought about a function for improving the reliability of the nuclear power generation plant or the nuclear fusion apparatus by applying to the function of the method of the first means or the second means to the above metal material.

According to the sixth means, there can be obtained a function for improving the metal material deteriorated by the nuclear transformation due to the irradiation of a neutron and a lapse of a period of time, by applying the function of the method of the first means or the second means to the above metal material containing helium caused by the nuclear transformation due to the irradiation of the neutron.

According to the seventh means, a helium content in the metal material containing helium is reduced by feeding current therethrough by the current-feeding means and then the metal material whose helium content is reduced is melted by the melting means, whereby the improvement and removal of defects of a metal structure is achieved.

According to the eighth means, defects of the metal material are detected by the inspection means and a helium content in the metal material is reduced by feeding current therethrough by the current-feeding means and then the metal material whose helium content is reduced is melted by the melting means, whereby the removal of defects of a metal structure is achieved.

According to the ninth means, the support pillar is moved in a three-dimensional direction by the crane so that the support pillar approaches a metal material portion to be improved. Next, the forward or back driving device is advanced to cause the rotating device to approach the surface of the metal material, and the moving device is rotated by the rotating apparatus to thereby make a movement locus align the improvement line of the metal material. Next, the chamber is moved by the moving device so as to surround the improving portion, the device driving forward or back is further advanced to make the chamber in pressure contact with the surface of the metal material and then gas such as inert gas etc. is blown into the chamber by the replacement device to thereby replace the interior atmosphere of the chamber with the gas. Next, the location adjustment driving means causes the current-feeding means and melting means to come into contact with or approach the surface of the metal material, the current-feeding means feeding current through the metal material to thereby reduce a helium content in the metal material and then the melting means melts the metal material to thereby achieve the improvement and removal of defects of a metal structure.

According to the tenth means, when the apparatus of the ninth means is employed in the nuclear reactor, since the support pillar is inserted into the upper grid plate and the lower grid plate in the nuclear reactor, there can be obtained a function for preventing large swing of the support pillar from occurring so that the improvement and removal of defects of a metal structure can be achieved at an accurate location, in addition to the function of the apparatus of the ninth aspect.

BRIEF DESCRIPTION OF THE DRAWINGS

FIG. 8 is a drawing showing the shape of a welding test piece composed of the neutron irradiated material in to the present invention and showing test conditions;

FIG. 9 is a comparison drawing showing the result of a welding test in to the present invention;

DESCRIPTION OF PREFERRED EMBODIMENTS

An embodiment of the present invention includes, when the repair of or improvement in material of metal material containing helium is to be performed, a series of steps of initially feeding current through a region of the metal material containing helium which region covers a portion where the repair or improvement in material thereof is to be performed without accompanying the melting of the portion to thereby reduce a helium content in the portion, and then heating the portion to melt it by generating heat thereat.

Figure 1:
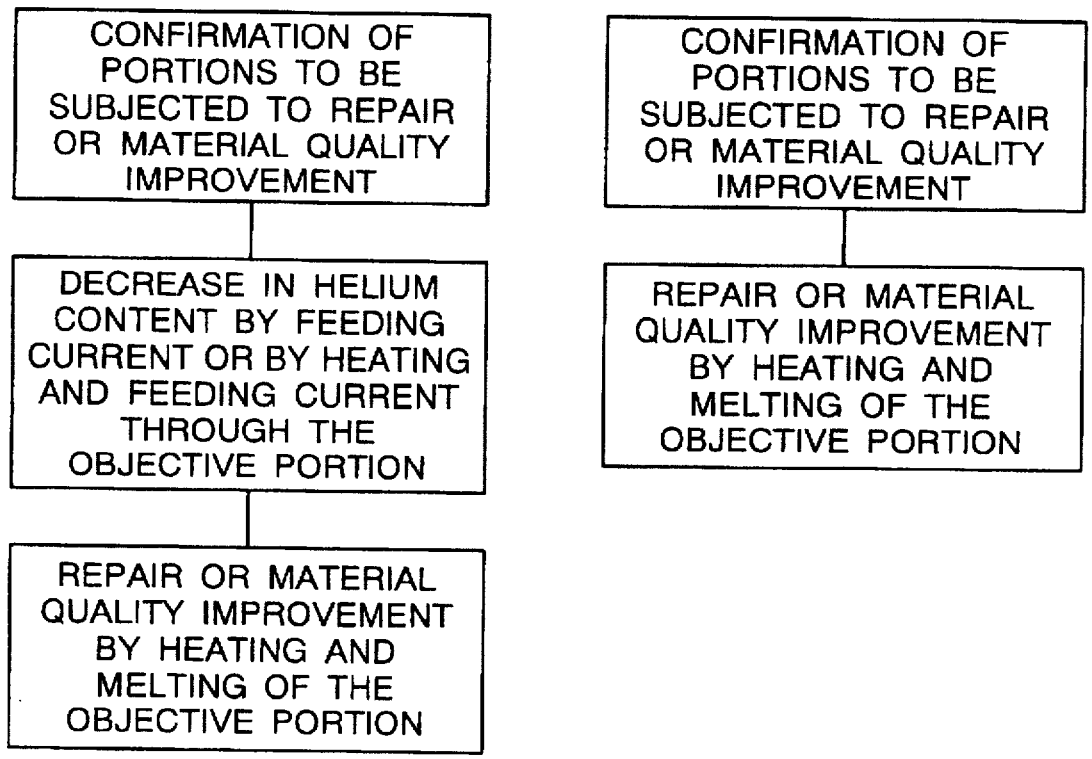
FIG. 1 is a view comparing the flow of a thermal working method of the present invention with the flow of a thermal working method of prior art.

FIG. 1 is a view comparing the flow of a thermal working method in this embodiment with the flow of prior art.

In the method of the embodiment, a method of generating heat at the portion after current had been fed through the portion may be a usual thermal working method or welding method in which there is used heat generated by an arc or laser heat source, by deformation, or by electric resistance etc.

When a helium content is reduced by feeding current in the thermal working method of metal material containing helium in the embodiment, it is preferable that the current is fed while heating the metal material because a more remarkable effect can be obtained by it. However, the metal material must not be melted by the current feed or the current feed accompanied with the heating.

When current feed or current feed accompanied with heating is previously performed through a region covering the portion so as to reduce a helium content in the portion where the repair or improvement in material of metal material containing helium is to be performed by the thermal working method of metal material in the embodiment, it is preferable to perform the current feed or the current feed accompanied with heating in vacuum or inert gas in a case where the temperature of the portion rises during the current feed or the current feed accompanied with heating.

Further, this embodiment provides a apparatus for performing the thermal working of metal material containing helium, which apparatus includes an inspection probe for detecting the location and size (length and/or depth of a crack) of a cracked defect in a repair portion or for detecting the location and size of a portion to be improved in material when the repair or improvement in material of the metal material is performed, a current feeding probe for feeding current through a region covering the repair or material improvement portion, a heating probe for heating the region covering the portion when the current is fed through the region, a heat generation system for heating and melting the portion by generating heat after the portion had been fed with the current or had been fed with the current while being heated, and a locating system for controlling the location of the inspection probe, the current-feeding probe, the heating probe and the heat generation system.

The inspection probe for detecting the location and size of the cracked defect (crack length and depth) of the repair portion or for detecting the location and size of the material improvement portion is an inspection probe for detecting the location and size of the crack or material improvement portion by a VT (image processing system by use of a camera), however, not only a crack length but also a crack depth can be measured by another cracked defect size sensing system using a UT (ultrasonic crack detecting device), EPC (electric corrosion potential) detecting system, electrolysis current detecting system and etc. in place of the VT.

The current-feeding probe for feeding current through the region covering the repair portion or material improvement portion is basically formed of an current introducing terminal and an electrode mounted at the extreme end thereof which constitute each of an anode side and a cathode side, and each current introducing terminal is connected to a power supply system capable of feeding current as large as about 1 kA.

Each electrode must be processed to have a shape coming into intimate contact with the shape of a repair portion or material improvement portion and it is preferable to provide a chuck for causing the electrode to come into intimate contact with the portion and pressing the electrode thereagainst.

Since the electrode on the anode side extends and the electrode on the cathode side contracts, it is preferable to form the electrodes by use of alloy which softens at high temperature or by use of metal or alloy having a spring structure.

Although TiMo alloy and etc. are preferable as the alloy softening at high temperature, it is more preferable to employ the spring-structured electrode when the electrode is repeatedly used.

It is preferable to arrange the spring-structured electrode as a molybdenum coil electrode or copper sheet-clad spring electrode.

When a repair portion or material improvement portion has a complex shape, current may be relatively uniformly fed through the portion by use of a water environment which can be prepared by providing a water environment cell at the extreme end of the electrode so that only the portion can be covered with water.

When the surface of a repair or material improvement portion is intensively oxidized by the temperature raised when the portion is fed with current or heated while being fed with the current and when this oxidation is not preferable, it is also possible to install a cover (environment cell) to put only the repair or material improvement portion into an environment of vacuum or inert gas so that current is fed through the portion from electrodes in the environment cell.

In this case, however, a vacuum system including a vacuum pump and a vacuum gauge must be connected to the vacuum environment cell.

Further, an air exhausing system and an inert gas introducing system must be connected to the inert gas environment cell.

Although the heating probe for heating the region covering the repair or material improvement portion without melting it when current is fed therethrough is fundamentally arranged in combination with the above current-feeding probe so as to heat the portion by resistance heating caused when current is fed, the heating probe may be provided independently of the current-feeding probe.

Since it is preferable to be able to adjust a heating temperature in any case, it is more preferable for the heating probe or the current-feeding probe to be provided with an cooling system and an temperature measuring system.

The temperature measuring system is preferably arranged as a non-contact type such as an optical pyrometer etc., it may be arranged as a contact type such as a thermoelectric couple.

The heating probe system may employ any heating method such as heating by use of current feed, high-frequency heating, heating by the irradiation of electromagnetic wave occurring by a heat source such as laser etc. so long as it can uniformly heat the repair or material improvement portion.

Regarding the heat generating system for heating and melting by the generation of heat the repair or material improvement portion after the portion had been fed with current or heated while being fed with the current, various types of locally melting devices may be installed which make use of an arc or laser heat source, heat generation by deformation, heat generation by electric resistance etc., and the like.

Although an arc-generating probe including a usual welding device such as a TIG etc. is fundamentally preferable when the repair portion has a small crack, when the crack is long and deep and cannot be entirely filled with melt by welding, the crack may be removed and the removed potion may be filled by built-up welding thereafter.

In this case, a welding wire feed system may be further provided.

The heat generating system may be provided with a laser-generating probe including a laser heat source depending upon a type of defects or when improvement in material is intended.

When there are a multiplicity of small cracks spreading over the repair portion, for example, an advantage capable of easily melting the wide area can be obtained by the provision of a laser scanning system.

Further, when a crack has a large size and it is necessary to secure the strength soundness of a structure and equipment, there may be used a method of reinforcing the crack by covering the crack with a sheet member and then joining the peripheral portion of the sheet member to the structure and equipment by welding. Further, it may be possible to install the heat generating system which makes use of heat generation by deformation, heat generation by electric resistance etc.

In the latter case, the heat generating system can be with provided a resistance welder or a spot welder which includes a load system for pressing the sheet member against the structure and equipment and applying pressure thereto and a power supply system for feeding current through the load system.

Further, an arc generating probe system such as a TIG etc. capable of carrying out usual fillet welding may be provided together with a sheet member locating mechanism to weld a sheet member.

A locating system for controlling the locations of the inspection probe, current-feeding probe, heating probe and heat generating system is provided with a location confirming system for inputting the location of a crack repairing portion or a material improvement portion of the structures and equipments in a nuclear reactor with respect to a reference location which is a particular location in the nuclear reactor, which inputting is performed by using 3 D coordinates (X, Y, Z) or ($\alpha, \beta, \gamma$) (where X, Y, Z represent a rectangular coordinate system and $\alpha, \beta, \gamma$ represent a rotating system of coordinates). The locating system is further provided with a computer circuit for inputting locations, and a locating mechanism for controlling the locations of the above respective probes and heat generating system. The location of the crack or material improvement portion of the structures and equipments in a nuclear reactor is input to the computer circuit while measuring the crack or material improvement portion by connecting the inspection probe to the location-confirming system. The locating mechanism, which is driven in response to the information accumulated to the computer circuit, is electrically connected to the current feeding-probe, heating probe and heat generating system; and the current-feeding probe, heating probe and heat generating system are moved by the locating mechanism to the location of the crack or material improvement portion of the structures and equipments which is stored from the inspection probe to the computer as a location on the 3 D coordinates; and the thermal working can be carried out by moving the respective probes or system while controlling the location of the thermal working in accordance with each of the steps.

With the employment of the thermal working method and thermal working apparatus of the embodiment shown above, when the structures and equipments constituting a nuclear power generation plant and nuclear fusion apparatus in a service period of time or prolonged service period of time are to be repaired or improved in material, a working portion can be prevented from being cracked due to the thermal working, and actual working can be easily achieved practically.

The inventors researched a thermal working technology while assuming a case of repairing crack-like defects caused by any reason in structures and equipments formed of metal material and installed in a nuclear power generation plant and nuclear fusion apparatus or a case of performing improvement in material to a portion subjected to deterioration due to a lapse of period of time and the like.

As a result, the inventors have discovered that, when conventional thermal working was performed to metal material used under the environment of irradiation of radioactive rays (mainly neutron), a crack was caused in a thermally worked portion due to the existence of helium, and that even if the conventional thermal working was applied to metal material containing helium in an amount of 2–3 appm or more while using a conventional technology such as welding, surface melting by laser, and surface alloying treatment etc., it was impossible to prevent a crack from being caused during the thermal working.

Thus, after further research of technology two stages, the inventors have discovered that a crack caused to a thermally worked portion could be prevented by using such a process as, after an amount of He contained in a portion to be thermally worked was locally reduced, a thermal working method is performed to the portion in which method there is performed heating accompanied with the melting of the portion.

First, in the first step, metal material (SUS304 stainless steel and SUS316L stainless steel) into which He was introduced by ion implantation while using an ion accelerator was prepared and a method of locally reducing a He concentration was examined.

Samples were composed of the above stainless steel having a surface layer region to which He$^+$ion was implanted by using a Cockroft type ion accelerator having an acceleration voltage of 400 keV with a dimension of 300 mm 1×100 mm w×0.2 mm t (1: length, w: width, t: thickness).

An implanting amount of He was $1 \times 10^{23}$ He$^+$/cm$^2$, He being implanted in the atmosphere of vacuum of $\sim 5 \times 10^{-6}$ torr and the samples were not particularly cooled.

There were prepared seven pieces regarding each of SUS304 and SUS316L stainless steels to which He was implanted by the same method.

In the case, the stainless steel used to implant He thereto was a sample of about 0.2 mm thick prepared in such a manner as the stainless steel was cold-worked to a thin film having a thickness of 0.25 mm, the surface layer of the thin film was removed by electrolytic polishing (in a solution having a temperature of 13° C. with acetic unhydride: perchloric acid=19:1, an input current density for electrolytic polishing: 1.4 A/cm$^2$), the resulting thin film was subjected to a solution heat treatment at about $2 \times 10^{-5}$ torr and 1050° C. for 15 minutes and then water-quenched.

The following two types of experiments were performed while using the above stainless steel samples to which He was implanted, and a He content reducing effect in the samples was examined.

One of the experiments was an experiment in which there was performed a heat treatment at a low temperature of about 350°–500° C. disclosed in prior art (JP-A-62-23928). In the experiment, He-implanted four samples in total were subjected to a heat treatment of 350° C.×172 hours and 500° C.×172 hours in vacuum (after the samples were hermetically sealed in a quartz tube evacuated to about $2 \times 110^{-5}$ torr, they were heat-treated in an electric furnace and cooled with water in the state that they were sealed in vacuum).

In the other experiment, current was fed through samples after they had been implanted with He.

A current of 35 A was fed in vacuum of $5 \times 10^{-9}$ torr and in an Ar gas.

At the time, when the current was fed in vacuum, although the samples had a temperature distribution in a longitudinal direction, they were not melted and reached a maximum temperature of about 900° C.

Further, in the Ar gas, the current was fed while blowing an Ar gas to the samples from a pipe and the samples reached 500° C. or less even at a maximum temperature.

In the both cases, a current feed time was set to 50 hours.

Figure 2:
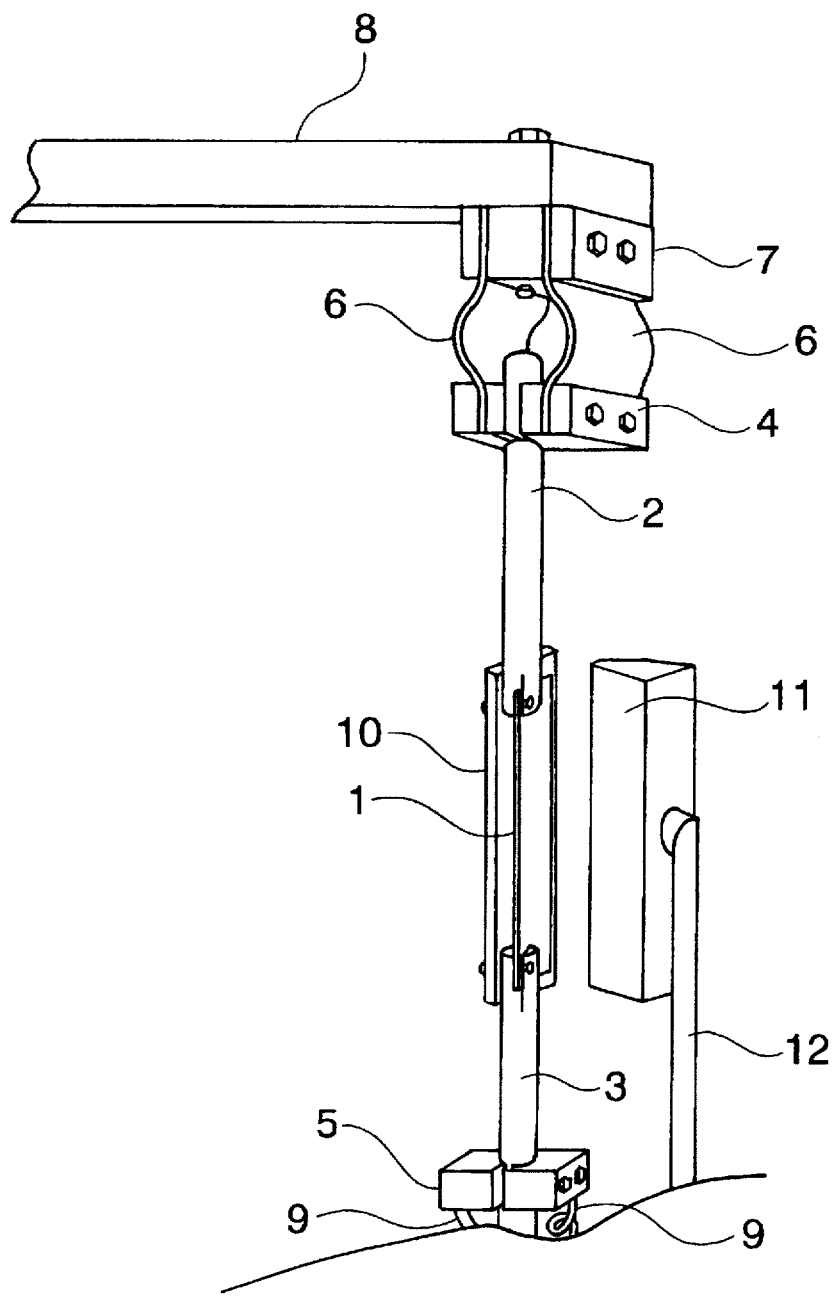
FIG. 2 is a perspective view of the main portion of experimental equipment which is used for feeding current in the present invention.

FIG. 2 shows an arrangement view of an experimental equipment used to feed current.

A sample 1 is mounted on an anode electrode 2 and a cathode electrode 3 and the respective electrodes are fixed by an anode side chuck 4 and a cathode side chuck 5.

Springs 6 each made by overlapping ten thin copper sheets (thickness: 0.1 mm) are disposed to a spring chuck 7 and attached to a copper arm 8 on the anode side.

Further, a spring coil 9 made of molybdenum is disposed to the chuck 5 on the cathode side to thereby absorb thermal expansion caused when current is fed to the springs 6 and 9. A reinforcing sheet 10 made of stainless steel and subjected to a surface insulating treatment is interposed between the electrodes 2 and 3 to relieve the deformation of the sample 1.

An inert gas introduction port 11 and an inert gas introduction pipe 12 are disposed to the specimen 1 so as to blow an inert gas (Ar) to a specimen surface subjected to ion irradiation.

The electrodes 2, 3 and the chucks 4, 5 are made of molybdenum.

Further, each of the chucks is formed of two to four blocks and tightened by stainless steel bolts.

Figure 3:
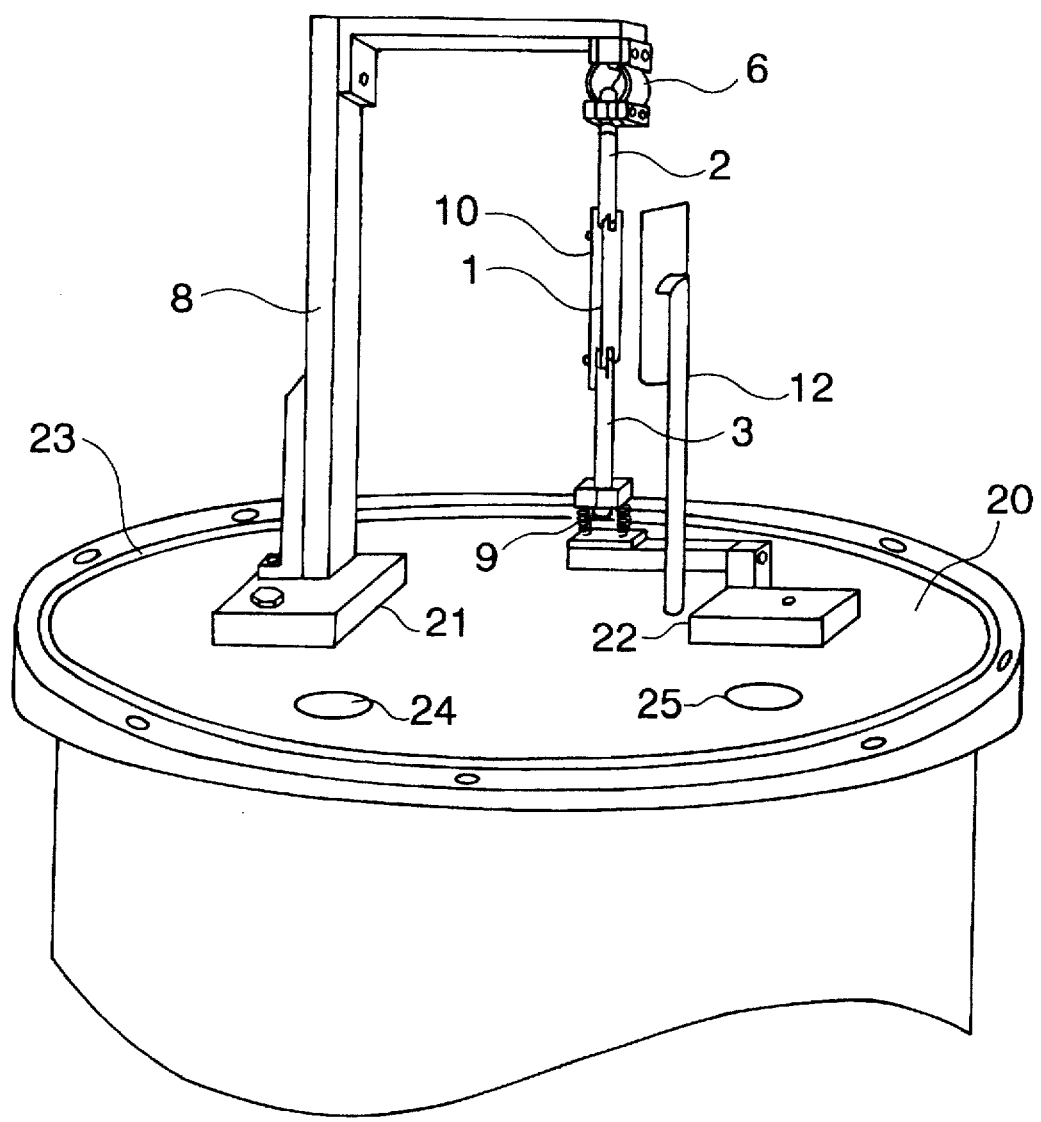
FIG. 3 is an overall outside perspective view of the current feed device of the experimental equipment of FIG. 1 used for feeding current in the present invention.

These electrodes and specimen supporting mechanism are installed on a stainless steel vacuum chamber base 20 shown in FIG. 3 through an anode current terminal base 21 and a cathode current terminal base 22. The terminal bases 21 and 22 are insulated from the vacuum chamber table 20.

A groove is formed on the chamber base 20 at a location denoted by numeral 23, an O-ring 23 is disposed in the groove, and these mechanisms are covered with a bell-jar which can keep these mechanisms in vacuum.

Figure 4:
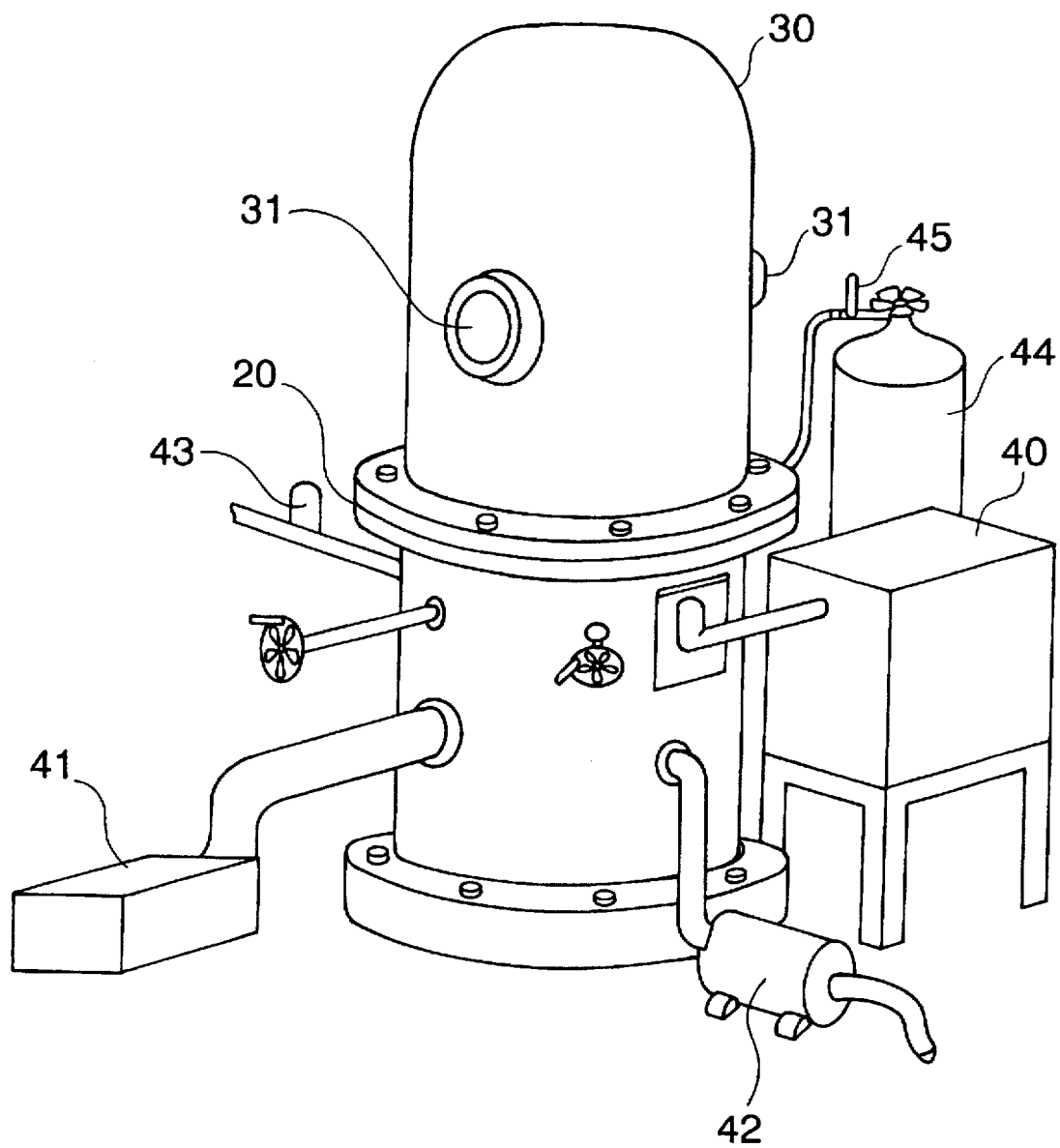
FIG. 4 is an overall outside perspective view of the experimental equipment of FIG. 1 used for feeding current in the present invention.

FIG. 4 shows the arrangement of a vacuum device for keeping the mechanisms of FIG. 3 in vacuum.

The vacuum chamber base 20 (FIG. 3 and FIG. 4) is covered with a bell-jar 30 of water-cooled type and the interior atmosphere of the bell-jar 30 can be evacuated from evacuation ports 24 and 25 shown in FIG. 3.

A specimen observing window 31 is formed in the bell-jar 30.

Current is fed from a current introduction terminal 40 of water-cooled type below the chamber base to the terminal bases 21 and 22.

To perform evacuation, there are installed a preliminary evacuation pump 41 for preliminarily evacuating the interior of the bell-jar 30 and an ion pump 42 for evacuating it to a high vacuum level and each of the pumps can keep vacuum in the interior of the bell-jar 30 to vacuum through the evacuation ports 24 and 25 (FIG. 3).

A degree of vacuum in the bell-jar 30 was measured by a vacuum gauge 43.

An inert gas (Ar) was blown to the specimen 1 in the bell-jar 30 when necessary from a gas cylinder 44 through the inert gas introduction pipe 12 (FIG. 2 and FIG. 3).

An amount of inlet gas was adjusted while observing a gas flow meter 45.

Whether a He content in the materials was reduced or not by the experiments of the heat treatment and current feed performed at the low temperature is shown in Table 1 in comparison with specimens to which no treatment was performed.

The He content in the materials was analyzed by a secondary ion mass analyzing method (SIMS) at the center and on the He implantation side of the specimens by using a CAMECA IMS-3 F instrument.

The result of analysis is shown by assuming an amount of He in the materials as ion-irradiated to be 1, and a He analyzing value of the materials subjected to the respective treatments is expressed by a value divided by an amount of He in the materials as ion-irradiated (standardized value).

It is found from the result shown in Table 1 that the He content in specimens (Nos. 2, 3, 4 and 5) was as large as that of a specimen (No. 1) subjected to a heat treatment of prior art and there was not any He content reducing effect.

On the other hand, the He content of specimens No. 6 and No. 7 subjected to the current feed in the present invention was reduced to 50% or less and it becomes apparent for the first time that a He content-reducing effect was able to be achieved by the current feed even at a low temperature of 500° C. or less.

TABLE 1

| SAMPLE NO. | TEST PIECE | TREATMENT | He ANALYZING VALUE (SIMS) | REFERENCE |
|---|---|---|---|---|
| 1 | SUS304 AND SUS316L 400 KeV He$^+$ ION IRRADIATED MATERIAL: IRRADIATED AMOUNT = 1 × 10$^{23}$ He$^+$/cm$^2$ | AS ION-IRRADIATED | 1 | REFERENCE MATERIAL; AS He-IMPLANTED |
| 2 | SUS304 AND SUS316L 400 KeV He$^+$ ION IRRADIATED MATERIAL: IRRADIATED AMOUNT = 1 × 10$^{23}$ He$^+$/cm$^2$ | LOW TEMPERATURE HEAT TREATMENT IN VACUUM; 350° C. × 172 hr, 2 × 10$^{-5}$ torr | 1 ± 0.05 | CONVENTIONAL TREATMENT |
| 3 | SUS304 AND SUS316L 400 KeV He$^+$ ION IRRADIATED MATERIAL: IRRADIATED AMOUNT = 1 × 10$^{23}$ He$^+$/cm$^2$ | LOW TEMPERATURE HEAT TREATMENT IN VACUUM; 500° C. × 172 hr, 2 × 10$^{-5}$ torr | 1 ± 0.05 | CONVENTIONAL TREATMENT |
| 4 | SUS304 AND SUS316L 400 KeV He$^+$ ION IRRADIATED MATERIAL: IRRADIATED AMOUNT = 1 × 10$^{23}$ He$^+$/cm$^2$ | LOW TEMPERATURE HEAT TREATMENT IN ATMOSPHERE; 350° C. × 172 hr, | 1 ± 0.05 | CONVENTIONAL TREATMENT |
| 5 | SUS304 AND SUS316L 400 KeV He$^+$ ION IRRADIATED MATERIAL: IRRADIATED AMOUNT = 1 × 10$^{23}$ He$^+$/cm$^2$ | LOW TEMPERATURE HEAT TREATMENT IN ATMOSPHERE; 500° C. × 172 hr, | 1 ± 0.05 | CONVENTIONAL TREATMENT |
| 6 | SUS304 AND SUS316L 400 KeV He$^+$ ION IRRADIATED MATERIAL: IRRADIATED AMOUNT = 1 × 10$^{23}$ He$^+$/cm$^2$ | CURRENT FEED AT HIGH TEMPERATURE; 35A (CURRENT DENSITY 500A/cm$^2$), 50 hr, 5 × 10$^{-9}$ torr, MAX. TEMPERATURE 900° C. | 0.2 ± 0.1 | TREATMENT OF THE INVENTION |
| 7 | SUS304 AND SUS316L 400 KeV He$^+$ ION IRRADIATED MATERIAL: IRRADIATED AMOUNT = 1 × 10$^{23}$ He$^+$/cm$^2$ | CURRENT FEED AT LOW TEMPERATURE; 35A (CURRENT DENSITY 500A/cm$^2$), 50 hr, Ar BLOWING OF Ar GAS, MAXIMUM TEMP. 500° C. | 0.5 ± 0.1 | TREATMENT OF THE INVENTION |

NOTE: HE ANALYZING VALVE IS SHOWN BY A STANDARDIZED VALUE BY ASSUMING OF He AMOUNT IN SAMPLE AS ION-IMPLANTED TO BE 1.

Further, it is found that the He content reducing effect was promoted (He content was reduced to about 20%) in the specimen No. 6 which was subjected to the current feed at a high temperature of 900° C. or less due to the employment of the high temperature, even if current feed conditions were similar to those of specimen No. 7.

It is discovered from the above experiment of the first step that when current is fed to stainless steel containing He, there can be obtained an effect to reduce a He content.

Next, the inventors performed an experiment of a second step while using a neutron irradiating material.

In the experiment of the second step, a material subjected to neutron irradiation was sampled from an apparatus in practical use, current was fed to the material likewise the above and then a welding test was performed. As a result, the inventors have achieved the present invention by confirming that a crack can be prevented from occurring at a thermally worked portion (welded HAZ portion).

The present invention will be described below by use of a specific example.

Figure 5:
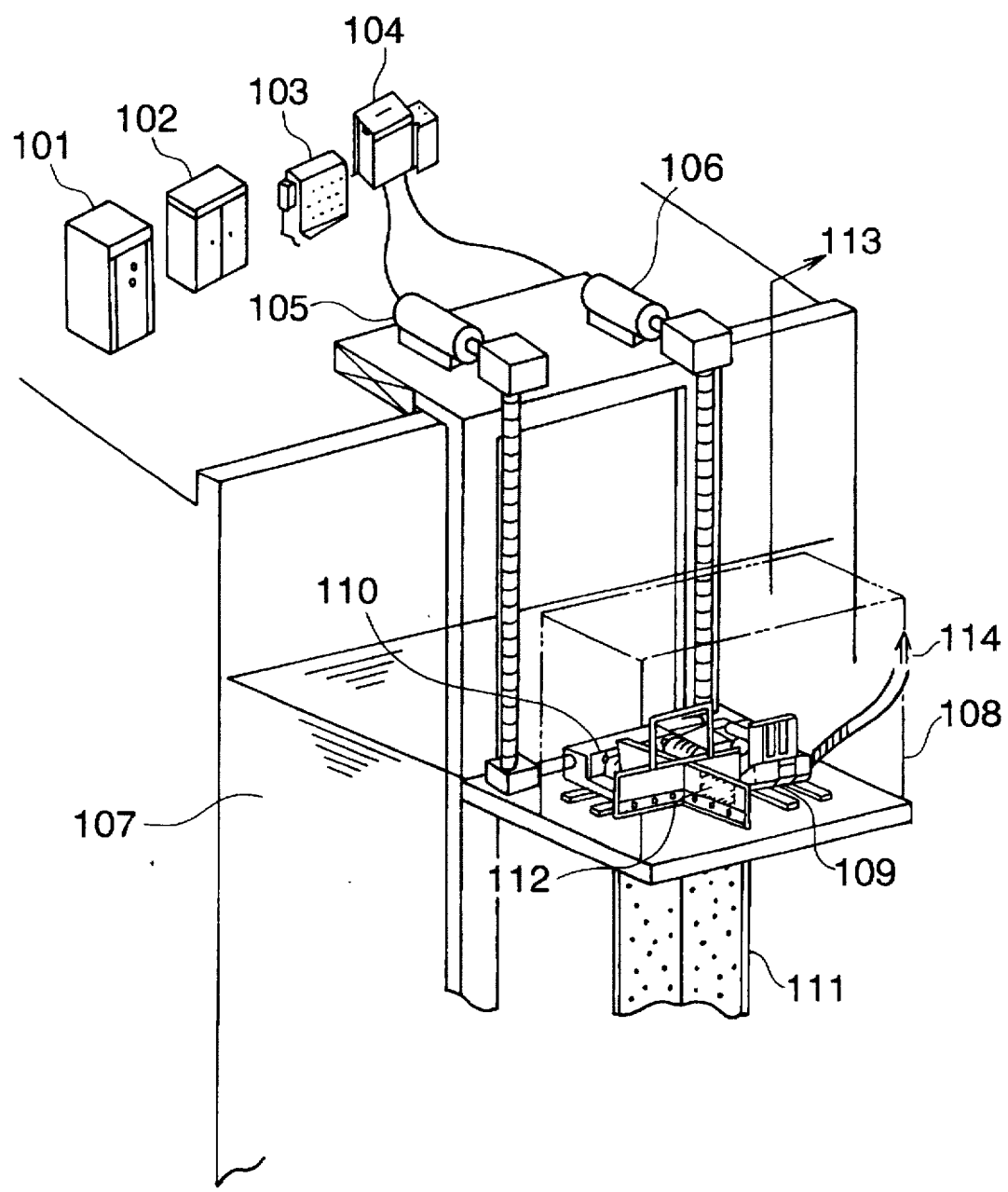
FIG. 5 is a perspective view of a device for sampling a neutron irradiated material in the present invention.

FIG. 5 is a perspective view showing the arrangement of a neutron irradiated material sampling device.

In FIG. 5, numeral 101 denotes a control board, numeral 102 denotes a plasma power supply unit, numeral 103 denotes a plasma control unit, numeral 104 denotes an operation board, numeral 105 denotes a polishing device driving unit, numeral 106 denotes a plasma torch driving motor, numeral 107 denotes a water pool, numeral 108 denotes a gas recovery hood, numeral 109 denotes a plasma cutting torch, numeral 110 denotes a surface polishing device, numeral 111 denotes a neutron irradiated material, numeral 112 denotes a welding test piece sampling device, numeral 113 denotes an exhaust port and numeral 114 denotes a plasma power supply unit connecting terminal.

After the surface of the neutron irradiated material 111 is polished by rotating a grinding stone mounted on the surface polishing device 110, the neutron irradiated material 111 is lowered, turned 90° C. and lifted, and then plasma-cut by the plasma cutting torch 109, the surface polished portion thereof being set at the location of the welding test piece sampling device 112.

The cutting is performed by moving the plasma cutting torch 109 vertically and horizontally by the plasma torch driving motor 106.

The devices such as the plasma cutting torch 109, surface polishing device 110 and etc. and the neutron irradiated material 111 are disposed in water in the water pool 107 through the hood of the gas recovery hood 108 because they are contaminated by the chip etc. of the neutron irradiated and radioactivated material 111 and further for the purpose of reducing an amount of exposure to radiation caused by the neutron irradiated material.

Gas in the gas recovery hood 108 generated when the plasma cutting and the like are performed is exhausted through the exhaust port 113.

Plasma generated from the plasma cutting torch 109 is controlled by both plasma power supply unit 102 and plasma control unit 103 through the plasma power supply unit connecting terminal 114.

Further, the polishing device driving unit 105 and plasma torch driving motor 106 are operated by the operation board 104 and the welding test piece collecting device is controlled by the control panel 101 as a whole.

Sampled welding test pieces were subjected to a heat treatment or current feed under the conditions shown in Table 2 and then used for welding experiment.

The heat treatment or current feed was performed by locating in a hot laboratory the same device as that used for the heat treatment or current feed performed through the He ion irradiated materials in the aforesaid experiment of the first step.

The He contents shown in Table 2 were obtained by cutting a portion of irradiated materials off as specimens and by analyzing an amount of He generated from the specimens by use of a mass analyzer until the specimens were made to a melted state while using a temperature raising-separation method.

A welding test piece sampled from the location of the welding test piece-sampling device 112 was subjected to TIG (tungsten inert gas) arc welding by using a welding test device. The entire arrangement of the welding test device is shown in the conceptual view of FIG. 6.

The neutron irradiated welding test piece 222 is placed on a table 223 in a chamber 221 isolated from the outside air, and a torch 230, a filler wire 228, a weld zone monitoring objective lens 225 and the illumination lamp 235 of an illumination device which are necessary for the TIG arc welding are located in the vicinity of the welding test piece 222.

An automatic voltage adjusting unit 234 is juxtaposed with the torch 230, and further an X-axis control system 231, Y-axis control system 232 and Z-axis control system 233 for controlling a torch location and a weaver 240 for weaving the torch are located in the chamber 221.

The filler wire 228 is fed from a wire reel 226 through a wire feeding-unit 227 and the feed speed of the wire is adjusted by a wire adjusting unit 229.

The weld zone monitoring objective lens 225 is connected to a radiation resistant camera 224 to monitor a weld zone at all times.

An atmosphere in the chamber 221 is measured by a dew-point hygrometer 236 to thereby control amounts of an Ar gas and dry air to be fed into the chamber 221 respectively from an Ar gas feed system 262 and a dry hot air feed system 263, and to thereby control an amount of Ar gas and air exhausted from a vacuum pump 271 to an exhaust system 272 and an amount of vapor exhausted from an exhaust system 273.

TABLE 2

| SAMPLE NO. | TEST PIECE | TREATMENT | He ANALYSIS VALUE (appm) | REMARKS |
|---|---|---|---|---|
| 8 | SUS304, IRRADIATED AMOUNT OF NEUTRON; $1 \times 10^{21}$ n/cm$^2$ | AS NEUTRON-IRRADIATED | 10 | REFERENCE MATERIAL |
| 9 | SUS304, IRRADIATED AMOUNT OF NEUTRON; $1 \times 10^{21}$ n/cm$^2$ | LOW TEMP. HEAT TREATMENT UNDER VACUUM; 350° C. × 172 hr, $2 \times 10^{-5}$ torr | 10 | CONVENTIONAL TREATMENT |

TABLE 2-continued

| SAMPLE NO. | TEST PIECE | TREATMENT | He ANALYSIS VALUE (appm) | REMARKS |
|---|---|---|---|---|
| 10 | SUS304, IRRADIATED AMOUNT OF NEUTRON; $1 \times 10^{21}$ n/cm$^2$ | LOW TEMP. HEAT TREATMENT UNDER VACUUM; 500° C. × 172 hr, $2 \times 10^{-5}$ torr | 10 | CONVENTIONAL TREATMENT |
| 11 | SUS304, IRRADIATED AMOUNT OF NEUTRON; $1 \times 10^{21}$ n/cm$^2$ | LOW TEMP. HEAT TREATMENT UNDER SURROUNDING ATMOSPHERE; 350° C. × 172 hr | 10 | CONVENTIONAL TREATMENT |
| 12 | SUS304, IRRADIATED AMOUNT OF NEUTRON; $1 \times 10^{21}$ n/cm$^2$ | LOW TEMP. HEAT TREATMENT UNDER SURROUNDING ATMOSPHERE; 500° C. × 172 hr | 10 | CONVENTIONAL TREATMENT |
| 13 | SUS304, IRRADIATED AMOUNT OF NEUTRON; $1 \times 10^{21}$ n/cm$^2$ | CURRENT FEED AT HIGH TEMP.; CURRENT DENSITY 500A/cm$^2$, 200 hr, $5 \times 10^{-9}$ torr, max. temp. 900° C. | 0.5 | TREATMENT OF THE INVENTION |
| 14 | SUS304, IRRADIATED AMOUNT OF NEUTRON; $1 \times 10^{21}$ n/cm$^2$ | CURRENT FEED AT LOW TEMP.; CURRENT DENSITY 500A/cm$^2$, 500 hr, Arblowing, max. temp. 500° C. | 0.7 | TREATMENT OF THE INVENTION |

A valve 264 is located at the midway point in an Ar gas and air passage extending from the Ar gas feed system 262 and dry hot air feed system 263 to the chamber 221.

The wire-feeding unit 227, wire adjusting unit 229, torch 230, X-axis control system 231, Y-axis control system 232, Z-axis control system 233, automatic voltage adjusting unit 234, illumination lamp of the illumination device and dew-point hygrometer 236 are connected to a control/operation board 243 through interchange boxes 241 and 242 and are controlled thereby.

Further, the weld zone monitoring objective lens 225 and radiation resistant camera 224 are controlled by the control/operation board 243 through the interchange box 242 and are driven by an arc motor 245. The torch 230 is connected to a welding power supply unit 253 through welding cables 251 and 252 and the welding power supply unit 253 is operated in association with the control/operation board 243.

When the vicinity of a weld zone is to be covered with an Ar gas atmosphere, arc generated from the torch 230 and the weld zone are covered with an Ar gas fed from the Ar gas feed system 261 through an Ar gas feed hose 265.

The welding power supply unit 253 is water-cooled by a water cooling device 254 and is further connected to a distribution board (3 phases, AC 200V) 225.

The control/operation board 243 and arc motor 245 are connected to a distribution board (AC 100V) 244.

Figure 7:
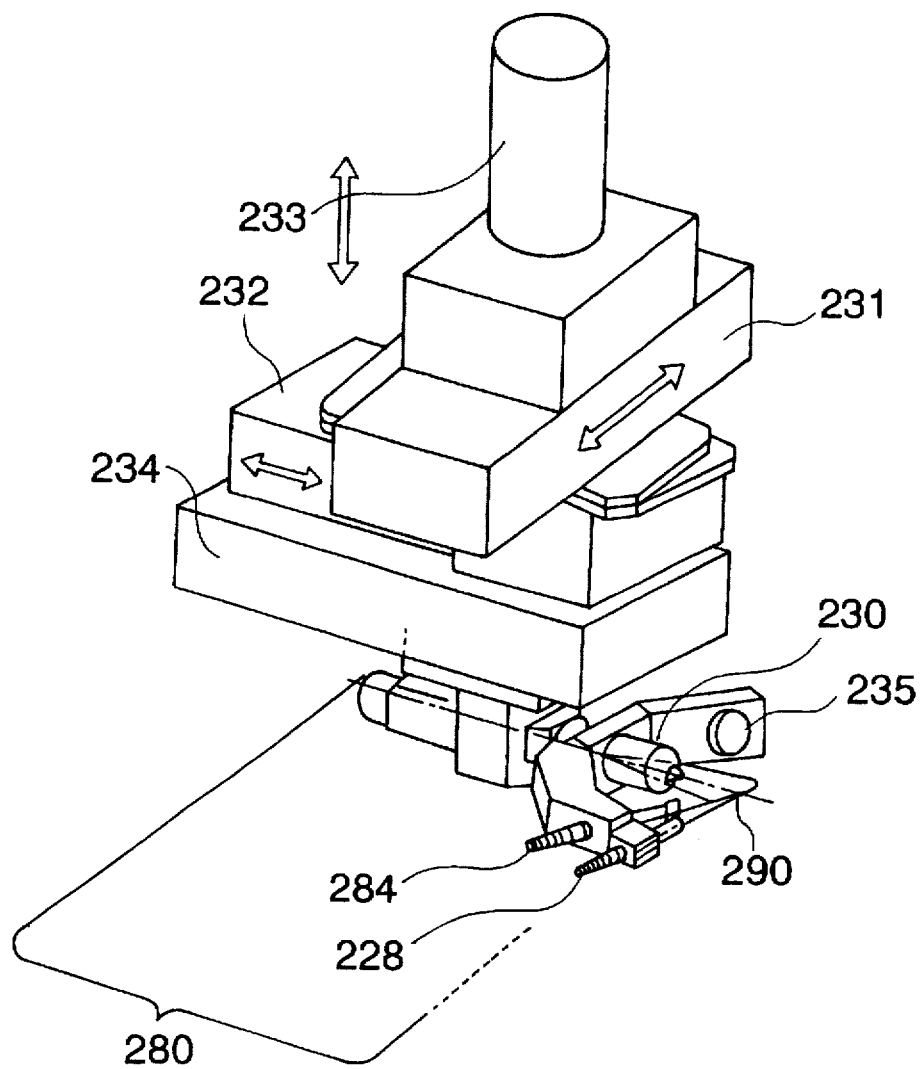
FIG. 7 is an overall perspective view showing the basic structure of a welding head in FIG. 6.

FIG. 7 is a perspective view showing the basic structure of a welding head.

The illumination lamp 235, the filler wire 228 and an image fiber 284 are disposed in the vicinity of the welding torch 230 so that they are focused at a welding location 290. The location of a torch assembly 280 is controlled by the X-axis control system 231, Y-axis control system 232 and Z-axis control system 233.

Further, a voltage of the torch 230 is adjusted by the automatic voltage adjusting unit 234.

FIG. 8 shows the shape of the welding test piece of the neutron irradiated material sampled by the device shown in FIG. 5, and shows welding conditions and the-cross sectional shape of a bead.

Welding was performed by use of a bead-on system.

FIG. 9 shows the result of observation of the cross section of weld zones of neutron irradiated materials (SUS304 steel, an irradiated amount of neutron: $1 \times 10^{21}$ n/cm$^2$) subjected to the treatments shown in Table 2 after a welding test was performed to the materials while using the device of FIGS. 6 and 7 under the conditions of FIG. 8.

Although crack was observed at a heat affected zone (HAZ zone) in the vicinity of a weld bead zone (welded metal zone) in a specimen (No. 8) in the state of neutron irradiation and in conventionally treated specimens (No. 9–No. 12), it was confirmed that the occurrence of crack was completely prevented in specimens (No. 3 and No. 14) subjected to the current feed treatment in the present invention.

As described above, a method of preventing the occurrence of weld crack at a portion where a He content is reduced can be realized, even if thermal working accompanied with melting is carried out to the portion, by the effect of reducing the He content at the portion where the thermal working is performed by the current feed in the present invention.

An example to which this method is applied will be described below.

Figure 6:
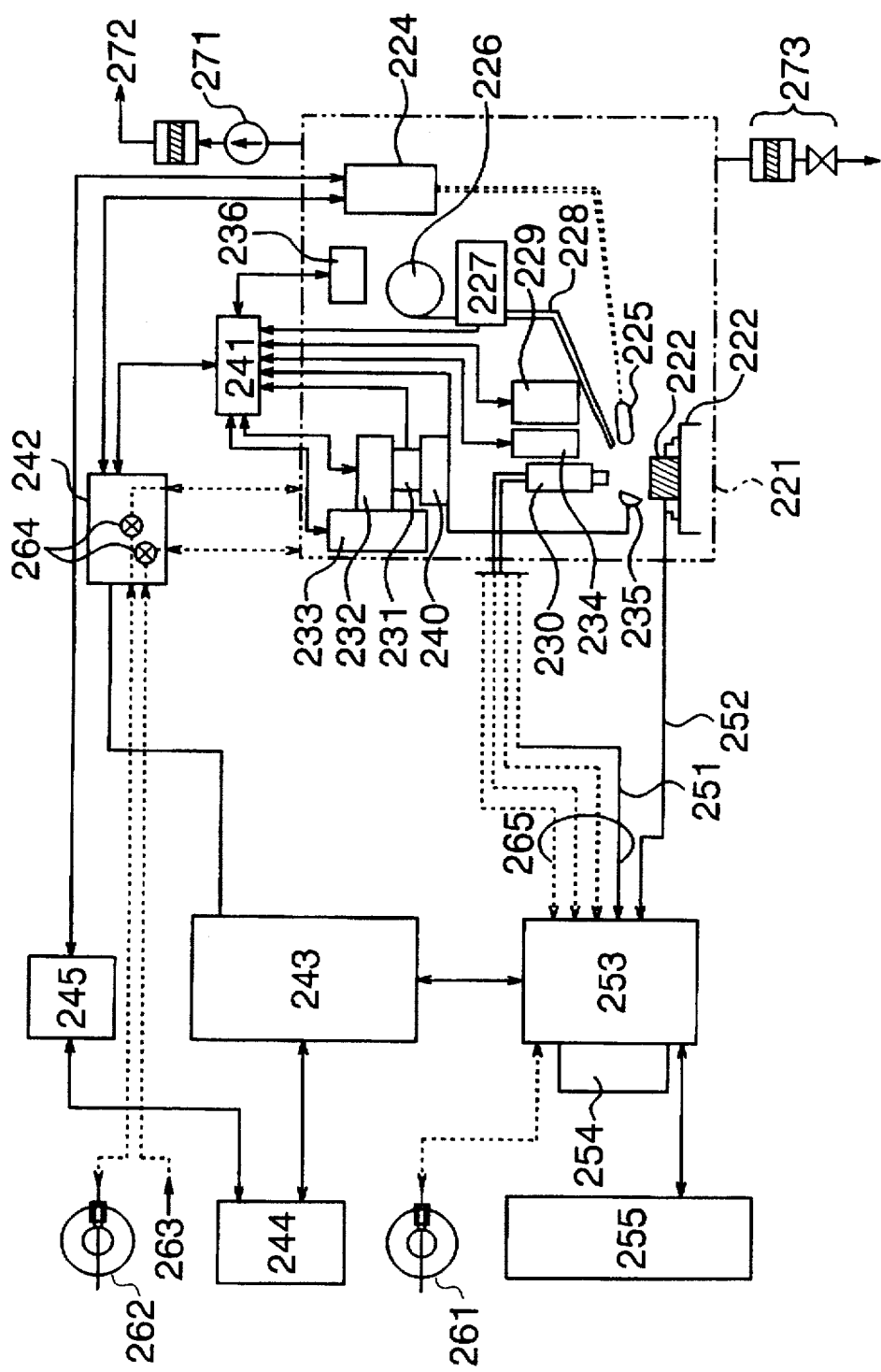
FIG. 6 is an overall conceptual block diagram showing the entire arrangement of welding test equipment for neutron-irradiated material in the present invention.

Specimens of SUS304 stainless steel, SUS304L stainless steel and SUS316L stainless steel to which neutron was irradiated up to an amount of $1 \times 10^{22}$ n/cm$^2$ were sampled by the device shown in FIG. 5 and current was fed to these specimens while using a device having the same arrangement as that shown in FIG. 2–FIG. 4 under the conditions of a current density 700 A/cm$^2$ · 240 hours, $5 \times 10^{-7}$ tort and a maximum temperature of about 1050° C. and then they were welded by the welder shown in FIG. 6 and FIG. 7 under the conditions of FIG. 8.

No crack was observed as a result of observation of the cross sections of the specimens welded by the thermal working method in the present invention.

Further, another example to which the thermal working method of the present invention is applied will be described below.

As an example of applying the present invention to the stainless steel structures in the pressure vessel of a light-water reactor, an embodiment of applying the thermal working treatment of the present invention to a region including a heat affected zone on the inside surface of a shroud from the outside of the pressure vessel by remote control will be described below with reference to FIG. 10–FIG. 15.

In this embodiment, a surface melting treatment was carried out in the vicinity of the welded portion of the inside surface of the shroud as a structure in the nuclear reactor by using the thermal working method of the present invention for the purpose of preventive maintenance. An irradiating amount of neutron to the shroud inside surface was about $1\times10^{21}$ n/cm$^2$ (neutron energy >0.1 MeV).

Figure 10:
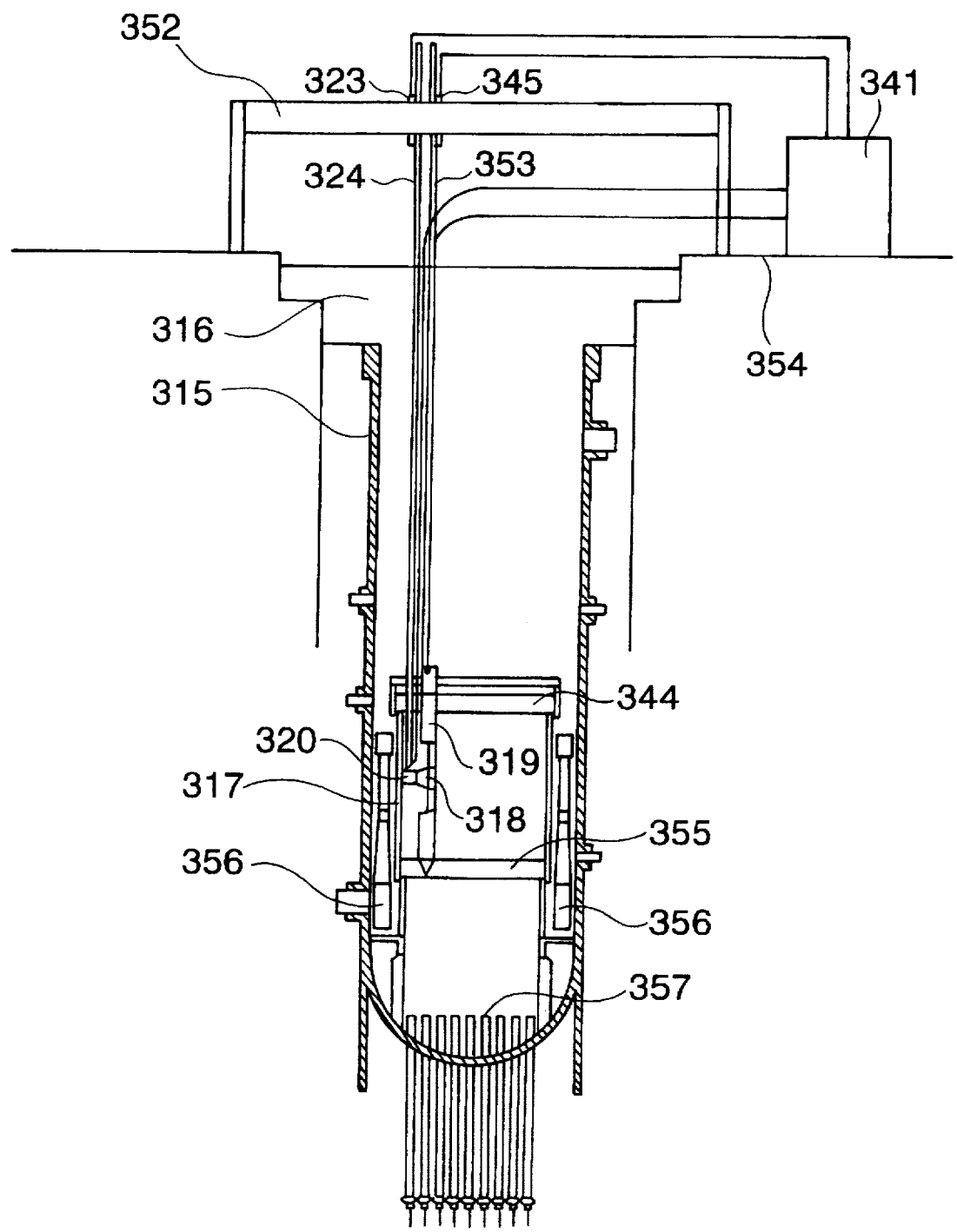
FIG. 10 is a longitudinal cross sectional view of the pressure vessel of a nuclear reactor showing an access state onto the inner surface of a reactor shroud.

FIG. 10 is a cross sectional view showing a state accessed to the inside surface of the shroud 317.

First, the upper lid of the pressure vessel 315 is removed, a vapor drier, a gas/water separator and a fuel channel are sequentially removed and further control rods are extracted from the bottom of the pressure vessel 315 and a reactor core is filled with reactor water 316.

FIG. 10 shows a lower reactor core support plate 355, a jet pump 356 and a control rod driving mechanism 377 for the sake of reference.

The nuclear reactor itself is installed in a state that it is sunk in a pool 354.

Next, a method of gaining access to a thermal working apparatus in the present invention will be described.

This embodiment will be described as to a case that working is performed by using an apparatus including an inspection probe, a heating and current-feeding probe, a heat generating system and a locating system as the thermal working apparatus.

First, a support pillar 319 having secondary arms each having an expandable/contractible mechanism is inserted into the reactor core.

The support pillar 319, which has a diameter to permit the pillar 319 to pass through an upper grid plate 344, is connected to a support pillar driving robot 353 and its driving mechanism 345 and can be restricted by the upper grid plate 344 and a lower grid plate 355 so that it is not greatly swung in the state shown in FIG. 10.

The support pillar driving robot 353, its driving mechanism 345, a chamber driving mechanism 323 and a chamber driving robot 324 are connected to a crane 352.

Figure 11:
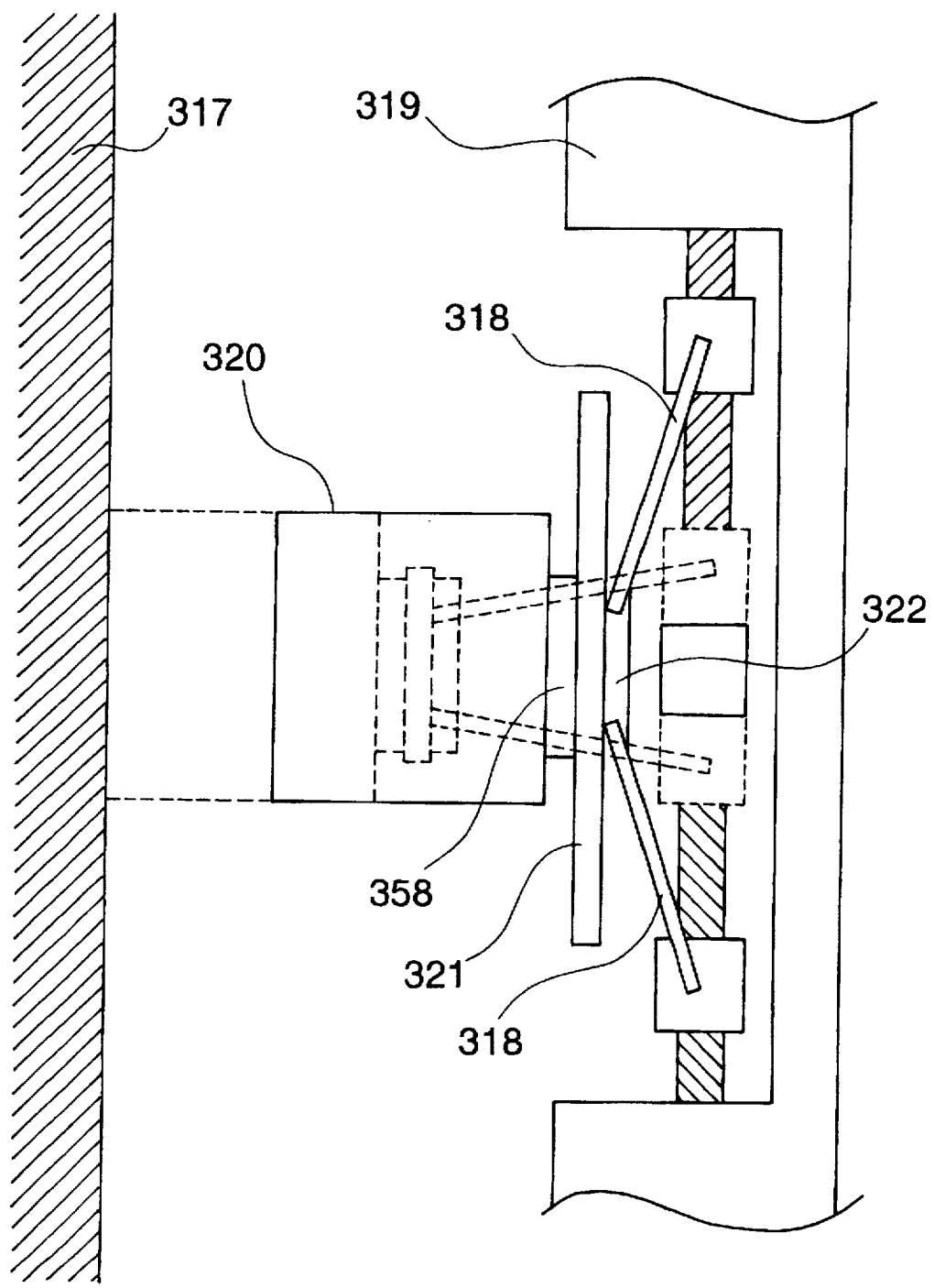
FIG. 11 is an enlarged view of the main portion of FIG. 10.
Figure 12:
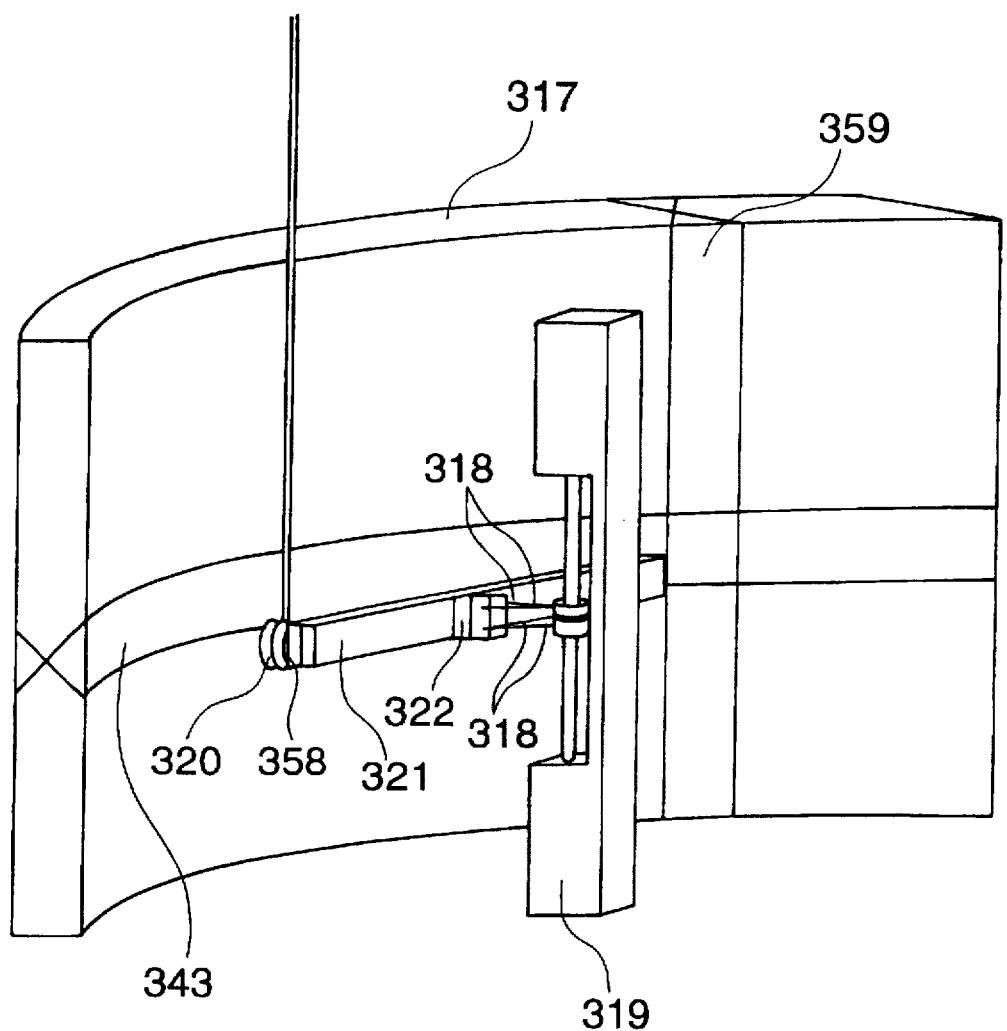
FIG. 12 is a perspective view of the main portion of equipment of FIG. 10 in a working state.

Further, as shown in FIG. 11 and FIG. 12, the secondary arms 318 have the expandable/contractible mechanisms in a direction perpendicular to the support pillar 319 and can be united to a water excluding chamber 320 at the extreme ends thereof by an electromagnetic mechanism 358. Further, there is provided a rotating mechanism 322 for turning a sliding mechanism 321 inserted in a vertical state after the sliding mechanism 321 is jointed to the chamber 320 and then the chamber 320 mounted on the sliding mechanism 321 slides and moves along the welding portion of the circumference of the shroud together with the sliding mechanism 321.

The vertically introduced sliding mechanism 321 is detachably joined to the chamber 320 by the electromagnetic mechanism 358.

FIG. 12 conceptually shows the circumferential welding portion 343 and longitudinal welding portion 359 of the shroud 317.

Next, the chamber 320 having the thermal working apparatus of the present invention is installed at a working portion on the inside surface of the shroud 317 by use of the chamber driving mechanism 323 (FIG. 10).

The chamber driving robot 324 is united to the chamber 320 by the electromagnetic mechanism.

This embodiment will show below a method of sequentially performing working by separately installing in the chambers 320 the inspection probe, the heating and current feeding probe and the heat generating system having respective functions as the thermal working apparatus of the present invention for each of an inspection process, a heating and current-feeding process and a surface improving process performed by the heat generating system and replacing the chamber for each working process.

Figure 13:
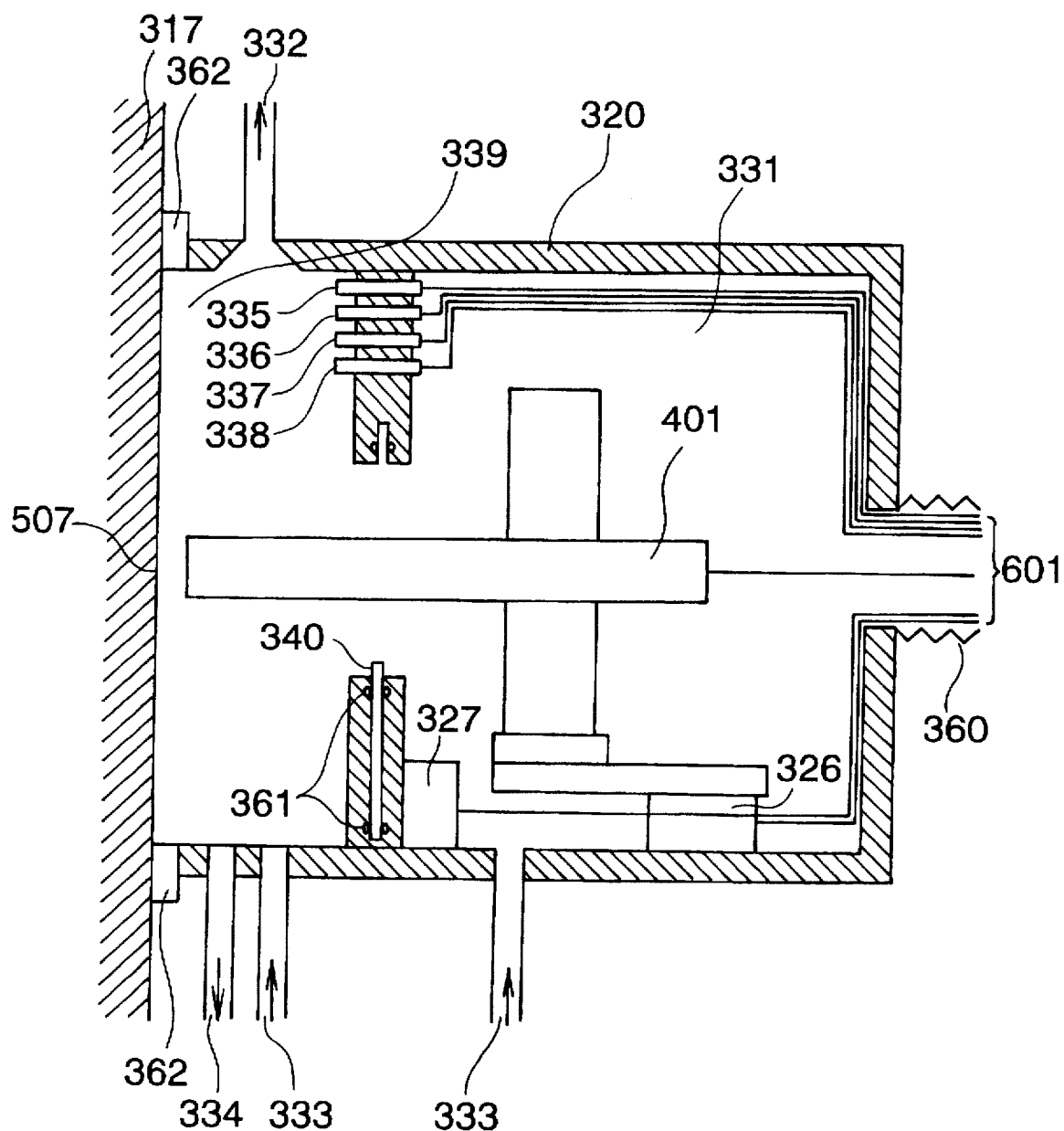
FIG. 13 is a longitudinal cross sectional view showing the interior of the chamber of FIG. 10 in which a defect detecting operation in the present invention is performed.

First, FIG. 13 shows a state for confirming a surface improving location 507 by installing the inspection probe 401 in the chamber 320.

Although the inspection probe 401 can inspect the state of the location 507 by a VT (image processing system using a camera), a UT (ultrasonic crack detecting device) may be installed as the inspection probe 401 in place of the VT, by which UT the presence or absence of defects such as cracks etc. existing in the depth direction in the vicinity of a surface and the state thereof can be inspected.

The chamber 320 has two chambers, that is, a chamber 331 always provided therein with on air or gas atmosphere and another chamber 339 provided therein with a water discharging mechanism 332, a gas pouring mechanism 333, a gas or dust exhausting mechanism 334, a gas flow rate monitoring mechanism 335, a gas pressure monitoring mechanism 336, a temperature monitoring mechanism 337 and a humidity monitoring mechanism 228 and which another chamber 339 is in contact with the surface of a structure exposed to a water environment. These two chambers are partitioned by a shield plate 340 having an opening/closing mechanism 340.

The chamber 320 is in intimate contact with the shroud 317 through an intimate contact plate 362.

The shield plate 340 is shielded by a shielder 361.

Further, a group of operation wires 601 is inserted into the chamber 320 from the outside of the reactor to drive and control the probe 401 and etc. through a bellows 360 capable of preventing water leak.

Respective drives and controls are performed from a remote operation room 341 (FIG. 10).

A location adjusting and driving mechanism 326 installed in the chamber 320 can adjust the location of the inspection probe 401 and drives it.

The shield plate 340 is opened and closed by an opening/closing mechanism 327.

Figure 14:
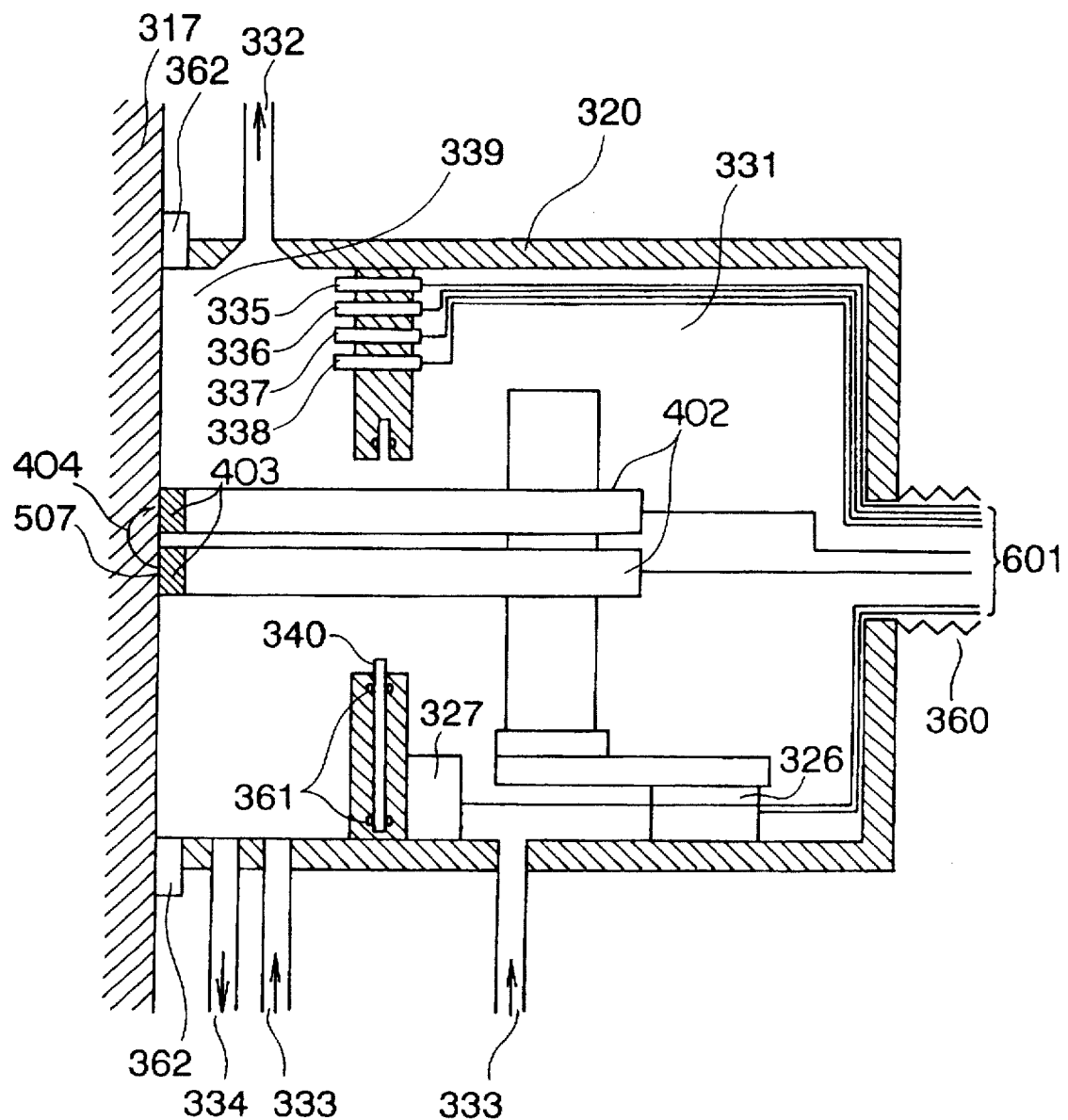
FIG. 14 is a longitudinal cross sectional view showing the interior of the chamber of FIG. 10 in which current feeding operation in the present invention is performed.

Next, FIG. 14 shows an example that the heating and current-feeding probe 402 is installed.

The heating and current-feeding probe 402 is installed in the chamber 320 and feeds current.

The probe 402 is formed of copper or stainless steel electrodes having electrode extreme end portions at the extreme ends thereof which are worked to come into intimate contact with the shroud 317.

The extreme end portions 403 are made of molybdenum.

A DC current having a current density of 500 A/cm$^2$ was fed from the electrode extreme end portions in intimate contact with the shroud 317 for 200 hours to thereby reduce a He content in the operation portion 507 of the shroud 317 along a direction 404.

The temperature monitoring mechanism 337 indicated a temperature of about 500° C. by the current feed.

Other mechanisms were the same as those of FIG. 13.

Subsequently, a surface melt processing by the heat generating system which is performed as a final process will be described with reference to FIG. 15.

Figure 15:
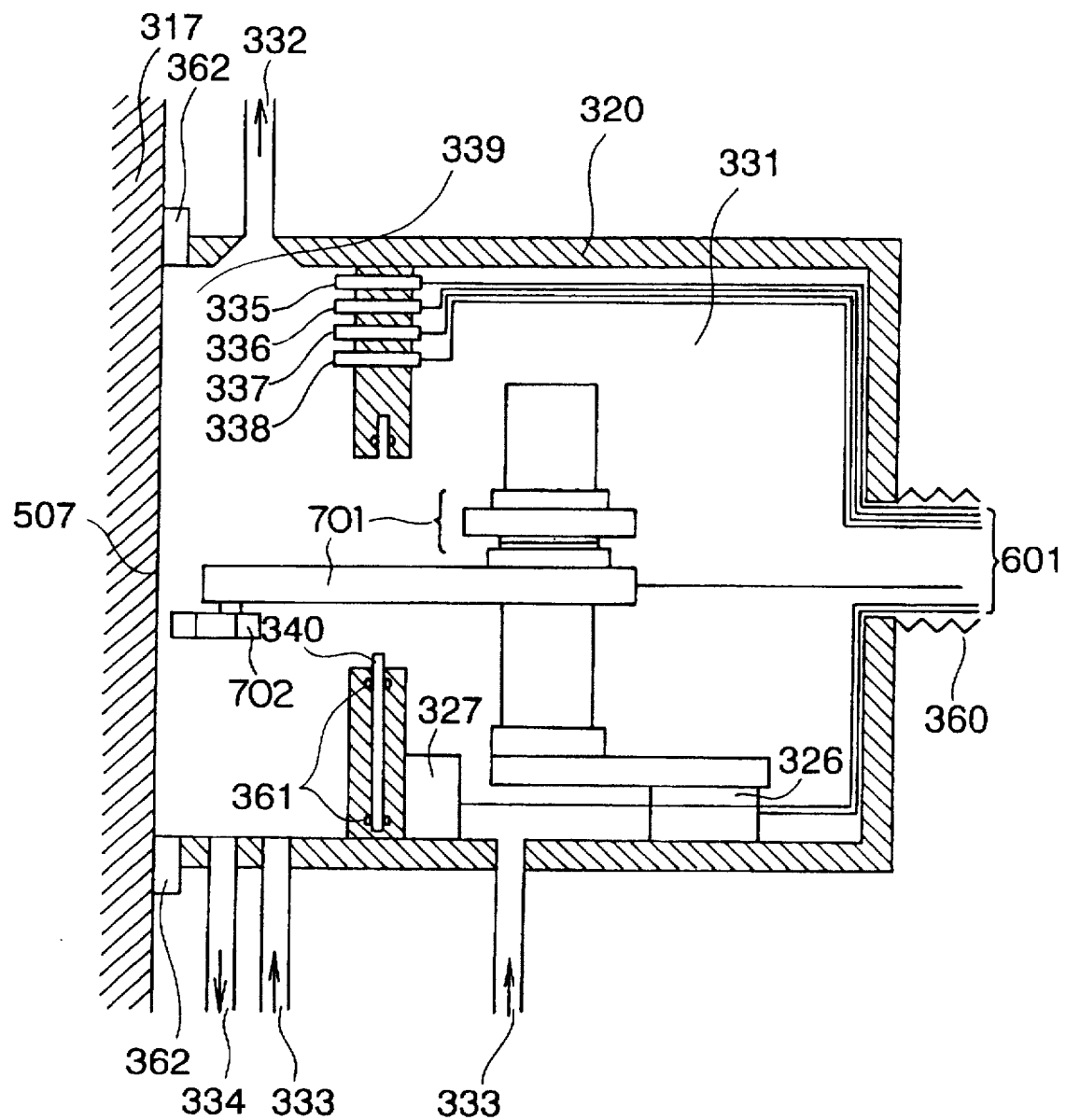
FIG. 15 is a longitudinal cross sectional view showing the interior of the chamber of FIG. 10 in which a melting processing operation in the present invention is performed.

FIG. 15 shows the chamber 320 in which heat generating systems 701 and 702 are installed.

The heat generating system 702 is a welding head 230 similar to that shown in FIG. 7 and the heat generating system 701 corresponds to the respective location control systems 231, 232, 233 (FIG. 7) of X-, Y- and Z-axes. The welding head 702 includes a welding torch, illumination lamp, wire, and image fiber similarly to those shown in FIG. 7. A surface improvement portion 507 of the shroud 317 was melted by the welding torch.

However, other mechanisms of the heat generating systems are the same as those shown in FIG. 13.

Thereafter, the worked portion was subjected to nondestructive examination by the ultrasonic crack detecting device 401 of FIG. 13, and no crack was detected by inspection of the depth down to 1 mm from the lower side of a melted metal portion (in the direction toward the inside of the material from the surface), so that it was confirmed that a sound surface-melting processing could be carried out.

According to the above embodiments, in a case where a portion subjected to deterioration due to a lapse of period of time and/or subjected to a stress corrosion crack with respect to the structures and equipments of a nuclear reactor and nuclear fusion apparatus exposed to irradiation of neutron during the operation of the nuclear reactor and nuclear fusion apparatus, is repaired or preventively protected by thermal working accompanied with melting, it becomes possible to prevent crack from occurring in the vicinity of a welded portion, and thus the safety of nuclear power plants or nuclear fusion apparatus is more increased, the service life thereof being more prolonged, and the economical merit thereof is more improved.

According to the invention, there can be obtained such an advantage as a metal structure is improved and the defects thereof are removed by reducing a He content in a portion of metal material to which thermal working is applied.

According to the invention, there can also be obtained such an advantage as the reliability and service life of nuclear reactors and nuclear fusion apparatuses are more improved.

According to the invention, there can further be obtained such an advantage as metal material deteriorated over a period of time and neutron irradiation can be improved.

According to the invention, there can also be obtained such an advantage as an apparatus for improving a metal structure and removing the defects thereof by reducing a He content in metal material can be provided.

According to the invention, there can further be obtained such an advantage as an apparatus for improving a metal structure and removing the defects thereof by surely reducing a He content in metal material can be provided to remove the defects of the metal material and to improve the metal structure.

According to the invention, there can be obtained such another an advantage as an apparatus for improving a metal structure and removing the defects thereof by easily reducing a He content in metal material to thereby remove the defects of metal material can be provided.

According to the invention, there can be obtained such advantages as an apparatus can be surely installed in a nuclear reactor and as a job for improving a metal structure and removing the defects thereof can be performed at an accurate location.

What is claimed is:

1. A thermal working method of metal material having a helium content, comprising the steps of feeding current through a portion of said metal material which is to be thermally worked while keeping said portion to be thermally worked in an unmelted state so that the helium content is reduced in said portion, and then heating and melting said portion.

2. A thermal working method according to claim 1, wherein the feeding of current through said portion of said metal material is performed while heating said portion of said metal material.

3. A thermal working method of metal material containing helium according to claim 2, wherein at least one of the feeding of current through and the heating of said portion of said metal material is performed in a vacuum or in an inert gas environment.

4. A thermal working method according to claim 3, wherein both the feeding of current through and the heating of said portion of said metal material are performed in a vacuum or in an inert gas environment.

5. A thermal working method according to claim 1 or claim 2, wherein said metal material is metal material constituting a nuclear power generation plant or a nuclear fusion apparatus in a service period of time or in a prolonged service of time.

6. A thermal working method according to claim 5, wherein said metal material is metal material having a helium content due to nuclear transformation by neutron irradiation.

7. A thermal working method according to claim 1, wherein the feeding of current through said portion of said metal material is performed in a vacuum or in an inert gas environment.

8. A thermal working apparatus for metal material having a helium content, comprising means for feeding current through a portion of said metal material to be thermally worked without melting said portion to be thermally worked so as to reduce the helium content of said portion, and means for heating and melting said portion after said means for feeding current has fed the current through said portion.

9. A thermal working apparatus according to claim 8, further comprising inspection means for detecting defects in said metal material as said portion to be thermally worked.

10. A thermal working apparatus for metal material having a helium content, comprising:

current-feeding means for feeding current through said metal material having the helium content;

melting means for melting said metal material;

location adjustment driving means for freely movably supporting said current-feeding means or said melting means with respect to the surface of said metal material;

a chamber for locating therein said location adjustment driving means and having an open portion confronting said surface;

a replacement device having a gas blowing port connected to said chamber and changing an interior atmosphere of said chamber;

a moving device for moving said chamber in a horizontal direction while supporting said chamber;

a rotating device for vertically rotatably supporting said moving device;

a forward or back driving device for supporting said rotating device so that the rotating device is freely driven forward or back with respect to said surface;

a support pillar for supporting said device for driving forward or back driving device; and a crane for three-dimensionally movably supporting said support pillar.

11. A thermal working apparatus according to claim 10, wherein said support pillar has an outer shape for permitting said support pillar to be put into or to be taken out from an upper grid sheet a lower grid sheet in a nuclear reactor.

* * * * *